United States Patent Office 3,158,468
Patented Nov. 24, 1964

3,158,468
SEPARATION OF AN ACTINIDE METAL FROM AN ALLOY
Harry Pearlman, Tarzana, and Lloyd A. Hanson, Canoga Park, Calif., assignors, by mesne assignments, to the United States of America as represented by the United States Atomic Energy Commission
No Drawing. Filed June 22, 1962, Ser. No. 204,595
7 Claims. (Cl. 75—84.1)

Our invention relates to a method for the separation of an actinide series metal from an alloy thereof with a molten metal.

One of the directions in which nuclear reactor development is proceeding is towards breeder reactors which convert nonfissionable species into fissionable material. Thorium may be converted into fissionable U–233, and U–238 may be converted into plutonium. The fertile Th–228 is converted into U–233 by neutron capture followed by progressive beta decay through the element protactinium. The incentive for breeder reactor development is the conservation of our fissionable material resources and the utilization of the large amounts of potentially fissionable thorium.

A necessary part of a satisfactory thorium-uranium-233 fuel cycle is a process for separation and recovery of bred uranium from a thorium blanket. The thorium must also be recovered, free of contaminants, for re-fabrication of blanket fuel. The final form of the recovered uranium or thorium is dependent in part on the design of the particular reactor under consideration. It is known that uranium may be separated from a thorium-uranium alloy by dissolution in molten metals such as magnesium; the uranium is insoluble and separates from the resulting thorium-magnesium solution. (See, for example, U.S. Patent 2,942,968 and report NAA–SR–4942, available from the Office of Technical Services, Department of Commerce, Washington 25, D.C.) Zinc is another liquid metal which may be used to separate thorium and uranium. Distinct zinc-uranium and zinc-thorium phases are formed which may be readily partitioned. (Cf.: "Transactions of the Metallurgical Society of AIME," vol. 221, June 1961, pp. 573–579.)

In order to make such liquid metal extraction processes practical, it is also necessary to recover the thorium or uranium from the resulting alloy. Although magnesium and zinc can be vaporized by vacuum heating, equipment for condensing and collecting large quantities of the metal becomes bulky and cumbersome, and power consumption is high. Another proposed method involves the precipitation of thorium as thorium hydride by bubbling hydrogen gas through the melt. One disadvantage of this process is that about 8 wt. percent thorium remains unprecipitated in the solution at 675° C., the lowest practical operating temperature. As stated in the above report (NAA–SR–4942, page 16), a satisfactory method of separating thorium from thorium-magnesium, not involving evaporation of large quantities of magnesium, has not heretofore been found.

It is, therefore, the object of our present invention to provide an improved method for the recovery of a metal from the actinide series in high yield from an alloy thereof.

Another object is to separate the actinide element from Th-Mg, Th-Zn, and U-Zn alloys.

Another object is to provide a liquid metal extraction system for recovering thorium from a thorium-magnesium alloy in high yield in a relatively simple, economical process.

Other objects and advantages of our invention will become apparent from the following detailed description and the appended claims.

In accordance with the present invention, the actinide metal may be recovered from an alloy selected from the class consisting of Th-Mg, Th-Zn, and U-Zn by dissolving the alloy in molten lithium under an inert gas atmosphere. The alloy readily dissolves in liquid lithium forming a lithium alloy solution, and the actinide metal thorium or uranium precipitates as a finely divided solid which may be readily filtered. Recoveries of over 99.7% are obtained.

The actinide element is recovered in our process by heating the alloy, for example a thorium residue from an extraction process for the recovery of uranium from breeder fuels, with the molten metal in a sealed crucible containing an inert gas atmosphere such as helium. The crucible is of a material inert to lithium, for example stainless steel. The heating is conducted at a temperature at least sufficient to melt the lithium and at least about 50° C. above the melting point of the resulting alloy in order to ensure complete dissolution. For example, Li-Mg in a 0.7 Li/Mg ratio melts at 400° C. and in a 1:1 ratio at 335° C. The lithium-zinc alloys melt at a somewhat lower temperature; for example Li-Zn in a 1:1 ratio melts at 210° C. For Li-Mg in a 0.7 ratio, a temperature of about 450° C. is satisfactory, while a temperature of about 500–550° C. is preferred. When the lithium melts, reaction with the magnesium or zinc proceeds almost immediately and negligible vaporization of the melt occurs. Although dissolution is probably complete in the first hour, as solid pieces have not been detected with a probe, heating is continued for about two hours. This results in the formation of an alloy solution of Li-Mg or Li-Zn and the precipitation of the actinide metal as a finely divided solid.

Filtering of the solution normally occurs fairly rapidly, for example in about 60 to 90 seconds with laboratory-scale quantities of materials. Filtration may be effected readily by providing a pressure differential across the filter, for example by simultaneously evacuating a filtrate crucible and pressurizing the residue crucible. Completion of the filtration is indicated when the pressure differential can no longer be maintained between the residue and filtrate chambers. Different filtering media known to the art may be satisfactorily used; porous stainless steel filters having mean pore sizes ranging between 10 and 65 microns have been found to be satisfactory.

The actinide residue obtained in the filtration step may be concentrated by being replaced in the furnace and reheated under vacuum. Residual magnesium, zinc, and lithium not completely removed during filtration are distilled in this manner. Thorium does not volatilize because of its extremely low vapor pressure. The residual metals may alternately be dissolved away by placing the residue in water and adjusting the pH to between 7 and 8. The resulting finely divided actinide metal is separated from the liquid by centrifuging or filtering. The resulting actinide concentrate, after lithium, magnesium or zinc removal, may then be consolidated by arc-melting into a button in an inert gas atmosphere.

The following examples are offered to illustrate our invention in greater detail.

*Example I*

A thorium-magnesium alloy weighing 41.4 grams and containing 30 wt. percent thorium was placed in a crucible of type 316 stainless steel. The bottom of the crucible consisted of a porous type 316 stainless steel filter having a mean pore opening of 35 microns. This crucible emptied into a connecting filtrate crucible of mild steel having a bottom plug of type 316 stainless steel. The filtrate crucible was connected to an exhaust tube of type 316 stainless steel going to a vacuum pump. 20.3 grams of commercial grade lithium (Li/Mg ratio 0.70) were cleaned and placed in the residue crucible surrounding the thorium-magnesium alloy. The two-chamber assembly was then sealed and placed in a larger outer reaction chamber. Air and water vapor were removed by evacuating the reaction chamber several times, and the chamber was refilled with purified helium. The assembly was then heated by a resistance heater. Heating was continued for two hours at 550° C., and the solution then filtered by simultaneously evacuating the filtrate crucible to 20–25 inches mercury vacuum and pressuring the residue crucible to 1–2 p.s.i. helium pressure. The filtrate contained 0.02 wt. percent thorium and a lithium-magnesium alloy in an Li-Mg ratio of 0.65. The residue contained 73.2 wt. percent thorium, for a thorium recovery of 99.9%; the remaining lithium-magnesium in the residue had a ratio of 0.67.

The magnesium and lithium were then removed from the thorium-rich residue by distillation under vacuum. The residue weighed 15.74 grams (73 wt. percent thorium) and was distilled in vacuum (28 inches mercury) at a temperature of 800–850° C. for two hours. The residue consisted of 11.30 grams of thorium. Final consolidation of the concentrated thorium was satisfactorily achieved by arc-melting into buttons. After subtracting the amount of silica, the button composition was 95–96 wt. percent thorium. The remainder of the button was probably oxygen, since only trace amounts of lithium (less than 5 p.p.m.) or magnesium (50 p.p.m.) were found.

*Example II*

The same as Example I except that the thorium-rich filtrate residue was dissolved in distilled water adjusted to pH 7–8 with acetic acid. The resulting solid thorium was separated from the solution containing lithium and magesium. The initial Th-Li-Mg residue from the filtration step weighed 5.53 grams and contained 70 wt. percent thorium. The resulting residue from the water dissolution contained 3.30 grams, and consisted of 95.5 wt. percent thorium and 40 parts per million lithium.

The above examples are illustrative rather than restrictive of our invention which should be understood to be limited only as is indicated in the appended claims.

We claim:

1. A method for the separation of an actinide metal from an alloy selected from the class consisting of Th-Mg, Th-Zn, and U-Zn, which comprises contacting said alloy in a molten state with lithium under an inert gas atmosphere, and then separating the resulting actinide metal precipitate from the resulting molten lithium alloy.

2. A method of recovering thorium from a thorium-magnesium alloy, which comprises dissolving said alloy in liquid lithium under an inert gas atmosphere, and then separating the resulting thorium metal precipitate from the resulting molten lithium-magnesium alloy.

3. A method of recovering thorium from a thorium-magnesium alloy, which comprises dissolving said alloy in lithium at a temperature of approximately 400–600° C. under an inert gas atmosphere, and then filtering the resulting composition, thereby separating the resulting magnesium-lithium solution from the resulting thorium solid filtrate residue.

4. The process of claim 3 wherein the filtration step is conducted at a temperature of approximately 400–600° C.

5. The method of claim 3 wherein the separated thorium filtrate residue is further purified by heating in a vacuum, thereby distilling away any residual lithium and magnesium.

6. The method of claim 3 wherein the separated thorium filtrate residue is further purified by dissolving said residue in water adjusted to a pH of about 7 to 8, and then separating the resulting undissolved thorium from the solution containing any residual lithium and magnesium dissolved therein.

7. A method of recovering thorium from a thorium-magnesium alloy which comprises dissolving said alloy in lithium at a temperature of approximately 500–550° C. under an inert gas atmosphere, filtering the resulting composition at said temperature, thereby separating the resulting magnesium-lithium solution from the resulting solid thorium filtrate residue, and then heating said residue in a vacuum, thereby distilling away any residual lithium and magnesium.

References Cited by the Examiner

UNITED STATES PATENTS 3,029,142   4/62   Coffinberry _____ 75—84.1

OTHER REFERENCES

First Geneva Conference on Atomic Energy, vol. 9, pages 591–595, 1955.

CARL D. QUARFORTH, *Primary Examiner.*

OSCAR R. VERTIZ, *Examiner.*